(12) United States Patent
Pham et al.

(10) Patent No.: US 8,173,059 B2
(45) Date of Patent: May 8, 2012

(54) MANUFACTURING PROCESS IMPROVEMENT

(75) Inventors: Duc Truong Pham, Cardiff (GB); Chunqian Ji, Cardiff (GB)

(73) Assignee: University College Cardiff Consultants Limited, Cardiff (GB)

( * ) Notice: Subject to any disclaimer, the term of this patent is extended or adjusted under 35 U.S.C. 154(b) by 848 days.

(21) Appl. No.: 11/911,225

(22) PCT Filed: Apr. 12, 2006

(86) PCT No.: PCT/GB2006/001341
§ 371 (c)(1),
(2), (4) Date: Jun. 13, 2008

(87) PCT Pub. No.: WO2006/109062
PCT Pub. Date: Oct. 19, 2006

(65) Prior Publication Data
US 2009/0220732 A1    Sep. 3, 2009

(30) Foreign Application Priority Data

Apr. 14, 2005    (GB) .................................. 0507484.4

(51) Int. Cl.
*B29C 35/08* (2006.01)
*B29C 41/02* (2006.01)
(52) U.S. Cl. ...................................................... 264/401
(58) Field of Classification Search .................. 264/401
See application file for complete search history.

(56) References Cited

U.S. PATENT DOCUMENTS

| 5,238,614 | A | 8/1993 | Uchinono et al. |
| 5,693,144 | A | 12/1997 | Jacobs et al. |
| 5,705,117 | A | 1/1998 | O'Connor et al. |
| 5,824,259 | A | 10/1998 | Allanic et al. |
| 6,029,096 | A | 2/2000 | Manners et al. |
| 6,103,176 | A | 8/2000 | Nguyen et al. |
| 6,159,411 | A | 12/2000 | Kulkarni et al. |
| 6,179,601 | B1 | 1/2001 | Kruger et al. |
| 6,267,919 | B1 | 7/2001 | Tanaka et al. |
| 2003/0178750 | A1* | 9/2003 | Kulkarni et al. ............. 264/401 |

FOREIGN PATENT DOCUMENTS

DE    19954891    5/2001

OTHER PUBLICATIONS

Pham et al., "A Study of Recoating in Stereolithography", "Proceedings of the Institution of Mechanical Engineers Part C, Journal of Mechanical Engineering Science", Sep. 2002, pp. 105-117, vol. 217, No. 4, Publisher: Mechanical Engineering Publications, Published in: London, UK.
Renap et al., "Recoating Issues in Stereolithography", "Rapid Prototyping Journal", 1995, pp. 4-16, vol. 1, No. 3, Publisher: MCS University Press, Published in: Bradford, Great Britain.

* cited by examiner

*Primary Examiner* — Leo B Tenton
(74) *Attorney, Agent, or Firm* — Fogg & Powers LLC

(57) ABSTRACT

A method of manufacturing an article using stereolithography in which the article includes at least one feature that defines an isolated volume is described. The method includes the step of forming one or more removable structures within said isolated volume from cured resin during the stereolithography process. The removable structures restrict the flow of liquid resin within said isolated volume.

2 Claims, 5 Drawing Sheets

MANUFACTURING PROCESS IMPROVEMENT

CROSS-REFERENCE TO RELATED APPLICATIONS

This application claims the priority under 35 U.S.C. 371 of prior PCT application PCT/GB2006/001341, filed Apr. 12, 2006, which in turn claims the priority of prior Great Britain patent application no. 0507484.4, filed Apr. 14, 2005, all of which are incorporated herein in their entirety by reference.

The present invention is directed to an improved manufacturing process. In particular, the present invention is directed to an improvement in stereolithography.

FIG. 1 shows a product 2 that is being manufactured by stereolithography. A working surface 4 has been prepared on top of the product 2 and the working surface is being cured in the areas indicated by the arrows 6 and 8. When cured, the dashed areas 10 and 12 will become part of the product 2. The process is then repeated in order to build up the product 2, layer by layer, before arriving at the finished product 2' shown in FIG. 2.

Thus, in the known stereolithography processes described above, a working surface is prepared for each layer before a laser is used to selectively cure the working surface to create a product. The preparation of this working surface is called recoating. The recoating process involves applying a fresh layer of liquid resin on top of the preceding cured layer. This operation often includes lowering the part into the resin contained in a vat, then sweeping with a blade over the top of the part to produce a layer with the precise thickness required to yield quality parts.

A problem with known stereolithography processes occurs when manufacturing a feature that isolates a volume of resin from the surrounding liquid resin.

The problem arises because the resin in the isolated volume, called a trapped volume, is cut off from the surrounding resin, pressure or gravity cannot act to level the top surface of the trapped resin with that of the surrounding resin. When the blade passes over a trapped volume in the manner described above, the liquid flow beneath the blade is complex. The amount of trapped resin can be less or more than what is required. If the amount of trapped resin is too little, the level of the resin within the trapped volume will be lower than that in the vat. This condition is called starvation. When too much resin is left in the trapped volume, mounding occurs. This is the case where the resin level inside the trapped volume is above that in the vat. Both starvation and mounding result in incorrect layer thickness along the borders of the trapped volume. In severe cases the part becomes delaminated due to the radiation being insufficient to cure thicker layers, or the blade strikes the cured resin during recoating, leading to build failures of the part. Many of the stereolithography process build failures can be attributed to trapped volumes.

FIG. 3 shows a product being fabricated using a prior art stereolithography technique. FIG. 3 shows a wall 30 being built using stereolithography on a build platform 32. The wall 30 defines an isolated volume and, as shown in FIG. 3, a mound of trapped resin 34 has been generated.

FIG. 4 shows a section of the product 30 taken about the line 4-4 in FIG. 3. The section of FIG. 4 shows the wall 30 and the mound of trapped resin 34. Also shown in FIG. 4 is a blade 36 that is being swept across the surface of the resin during the recoating process in the direction shown by the arrow 35. As shown in FIG. 4, the blade 36 sweeps away excess resin so that the top of the resin behind the blade 36 is approximately level with the bottom of the blade.

Build failure caused by trapped volumes is an important concern for stereolithography users. If problems due to trapped volumes are overcome, the process would be more reliable. This, in turn, would yield higher productivity, with less waste of labour and materials.

In a known stereolithography recoating process, the part being fabricated is dipped into the resin to ensure that the top of the part is fully covered. However, this requires a very long waiting time for the excess resin on top of the part to drain away. In addition, it is difficult to achieve thin layers in this way, because a certain amount of resin remains on top of the part due to surface tension. As described above, the stereolithography process can be improved by using a blade to sweep off the excess resin after the 'deep-dip' operation to leave a coat of fresh material for the next layer. However, the blade encounters problems when recoating over trapped volumes, as described above.

In 1996 3D Systems, one of the main manufacturers of stereolithography apparatus introduced an improved blade design for their new range of machines. This new blade, called the Zephyr blade, is an "active" blade, which holds resin within it and deposits a controlled amount on the part. This has eliminated the need for deep-dip and enabled the production of parts with more consistent quality. However, recoating over trapped volumes is still difficult, and still results in occasional build failures.

U.S. Pat. No. 5,096,530 describes a film recoating method in which successive films of resin are formed by four different types of mechanism.

U.S. Pat. No. 5,693,144 describes an enhancement to the recoating process by applying vibration energy to the building medium. One way to implement this is to position a number of vibrating needles in contact with the resin surface. Another way is to couple the vibration directly to the part support.

U.S. Pat. No. 5,902,537 describes an apparatus using counter-rotating rollers, ink-jet recoaters, spinning devices, and applicator bars for forming the successive layers of resin.

In "Recoating Issues in Stereolithography" (1995) Rapid Prototyping Journal, 1(3), 4-16, Renap, K. and Kruth, J. P. describe the recoating problems associated with the original passive blade, and proposed the application of higher sweep velocities for recoating deeper trapped volumes.

In "A study of recoating in stereolithography" (2003) Proceedings of the Institution of Mechanical Engineers, Part C: J. Mechanical Engineering Science, 217, 105-117. Pham, D. T. and Ji, C. describe a common phenomenon in recoating over trapped volumes, where starvation occurs initially, followed by mounding as the depth of the trapped volume increases. They also proposed a method where a lower sweep speed or a larger blade gap should be applied to help reduce starvation at the beginning of a trapped volume, then as the height of the part increases the sweep speed should be raised to decrease mounding.

Other remedies to trapped volumes suggested in the prior art include:
  building drain holes in strategic locations in the part;
  splitting the part in separate sections; and
  increasing the number of blade sweeps, the blade gap, and the z-wait time (i.e. the period between the end of the blade sweeping process and the start of the laser curing process).

The present invention seeks to overcome or address one or more of the problems identified above.

The present invention provides a method of manufacturing an article using stereolithography, the article including at least one feature that defines an isolated volume, the method comprising repeating the steps of:

applying a layer of resin (for example, a liquid resin); and curing (for example, laser curing) said layer of resin, the cured resin forming the said article, wherein said step of curing said layer of resin includes the step of forming one or more removable structures within said isolated volume from cured resin, wherein said one or more removable structures restrict the flow of liquid resin within said isolated volume.

The present invention also provides a product manufactured using a stereolithography process, the product comprising at least one feature that defines an isolated volume and one or more removable structures located within said isolated volume, wherein said removable structures are fabricated as part of said stereolithography process. The said removable structures are created by curing resin as part of the normal stereolithography process.

This invention relates to methods for solving problems of recoating over trapped volumes in stereolithography. By way of example, the invention has been used with trapped volumes having dimensions of around 10 mm across. The invented method improves the uniformity of layer thickness of deposited liquid materials around the trapped volumes. Therefore, the risks of layer de-lamination and collisions of cured resin with the blade are minimised. So, this invention provides a simple solution for enhancing the reliability of the stereolithography process.

The improvements of the present invention are achieved through a method of applying resistance to the liquid flow inside trapped volumes. The resistance is created by the generation of removable structures in the trapped volume. These removable structures can be constructed in a range of forms such as walls or blocks within the trapped volume. Because the removable structures provide resistance to the liquid flow inside the trapped volume during the blade sweeping movement, the amount of liquid resin being scooped out of, and flowing backwards to, the trapped volume is controlled.

The removable structures may be formed by laser curing said resin; for example, the removable structures may be strands forms by laser curing said resin. The removable structures may include one or more strings connected between adjacent strands, wherein said strings are formed by laser curing said resin.

The removable structures may be removed once the manufacture of said article is complete. In some forms of the invention, the removable structures are designed such that they are readily removable by hand. For example, in one form of the invention, the removable structures are in the form of a number of fine strands situated throughout the trapped volume, the fine strands having a small cross-section such that they are easy to remove by hand.

As part of the stereolithography process, the resin may be spread, for example using a blade, after the resin is applied. Further, each layer of liquid resin may be applied on top of previously cured resin by lowering the article into a vat of liquid resin. Alternatives to this arrangement include using a so-called active blade that both applies and spreads the resin in a single application step.

The positions of the removable structures may be defined automatically, for example by a software program. Alternatively, the positions of the removable structures may be specified by a human operator.

The method may comprise the step of identifying isolated volumes. In one form of the invention, isolated volumes are identified automatically, for example by a software program. Alternatively, isolated volumes may be identified by a human operator.

The present invention is easy to implement, and does not require the provision of additional hardware. Using appropriate software, three-dimensional models of removable structures can be generated for a part with trapped volumes during data preparation. Software used for generating the article being manufactured can be used to implement the removable structures of the present invention. Afterwards, the part is treated as a normal part in the ongoing processes. The removable structures are produced as part of the normal stereolithography process and are built of the part material while the part is constructed. Therefore, there is no effect on other parts to be built on the same platform. Once the build is complete, the structures can be removed. When this method is applied, the constraints associated with trapped volumes are avoided. Hence, there will be more freedom to select part build orientation, without risking build failures and sacrificing part accuracy and build time.

Embodiments of the invention will now be described with reference to the accompanying schematic drawings of which:

Figure 5:
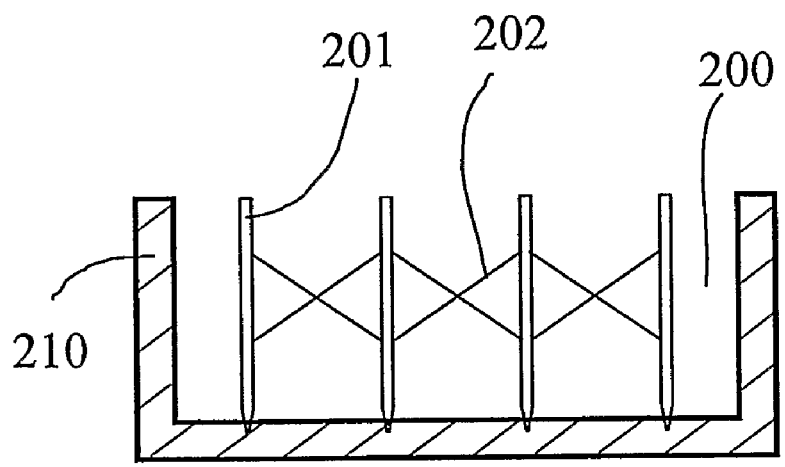
FIG. 5 is a cross-section of a product being fabricated in accordance with the present invention.
Figure 6:
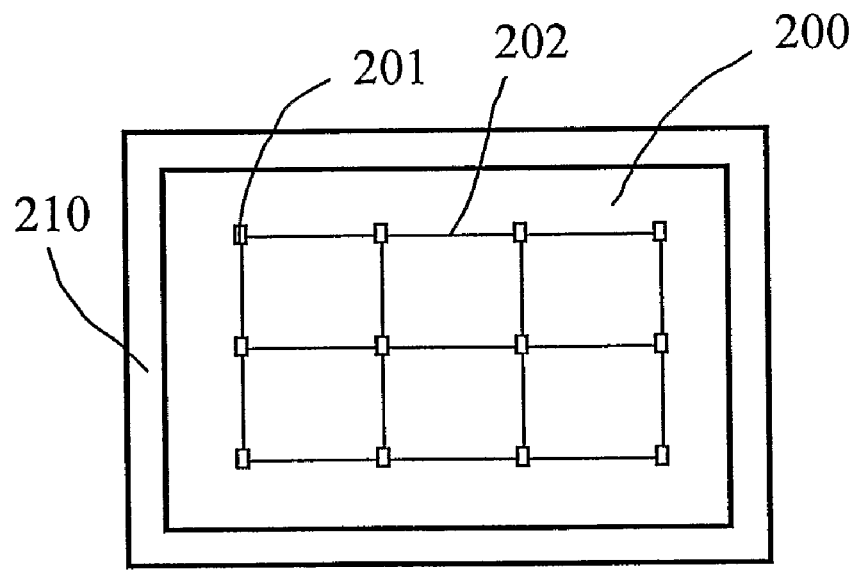
FIG. 6 is a plan view of the product of FIG. 5.

FIGS. 5 and 6 show a part 210 fabricated in accordance with the present invention. The part 210 defines an isolated volume, indicated generally by the reference numeral 200.

Within the isolated volume 200 are formed a number of strands 201 in a grid pattern at centres of between 3 and 7 mm (i.e. with adjacent strands 201 being separated by between 3 and 7 mm), with the outer row of strands positioned at a distance of 1 to 3 mm from the wall of the part 210. Also, adjacent strands 201 are diagonally connected with fine strings 202 to provide additional support. In the remaining data preparation and part build processes, the part is treated as normal. The method can be implemented manually or automatically. However, the automatic mode is preferred, where software is developed for the tasks of identifying trapped volumes and generating strands. That software may be embedded into other software packages. For example, a software program being used to define the part being manufactured can readily be used to define the stands and strings described above.

Figure 7:
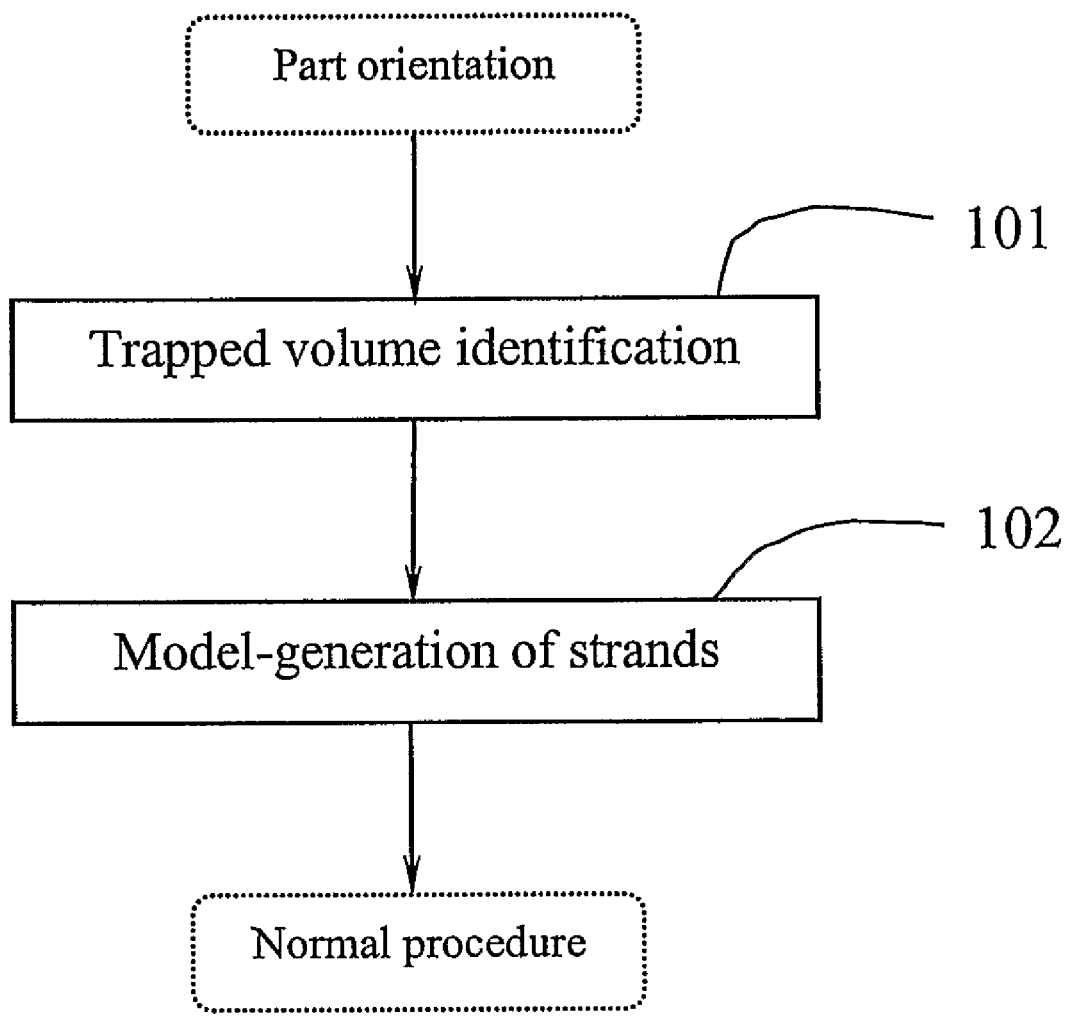
FIG. 7 is a flow chart depicting the steps involved in manufacturing a product in accordance with an aspect of the present invention.

A typical implementation of the invention is outlined below, with reference to the accompanying drawings. FIG. 7 is a flow chart depicting the steps involved in implementing a preferred embodiment of this method. The build orientation is selected as normal, and the trapped volume 200 identified in step 101. For the trapped volume, strands 201 are generated from the bottom to the top in step 102. The fine support structures of the 3Dlightyear software package are used for this purpose.

Figure 1:
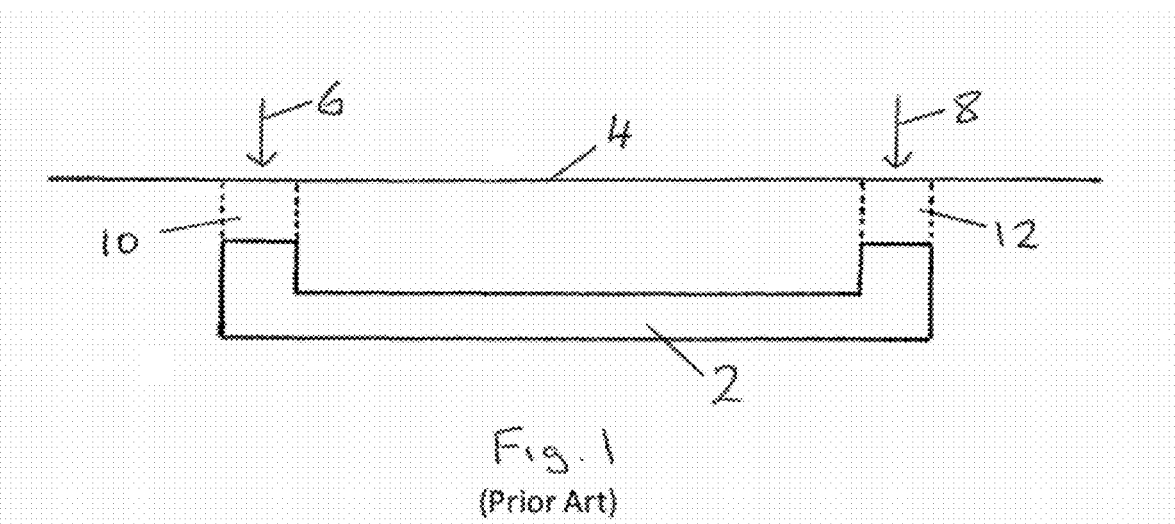
FIG. 1 shows a product being fabricated using a known stereolithography process.
Figure 2:
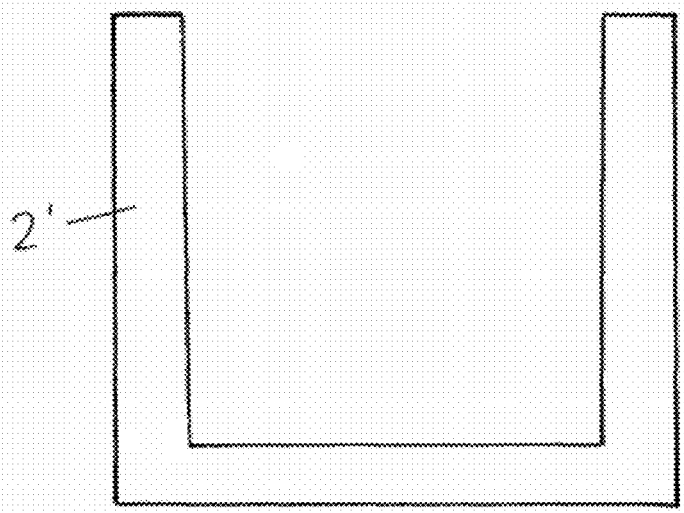
FIG. 2 shows the product of FIG. 1 in its final form.
Figure 3:
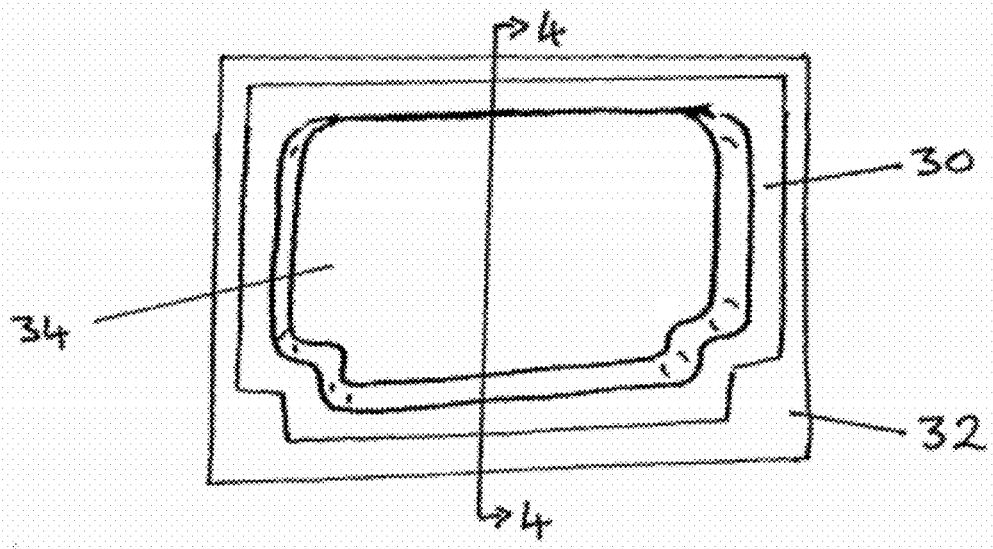
FIG. 3 shows a product being fabricated in accordance with a known stereolithography method.
Figure 8:
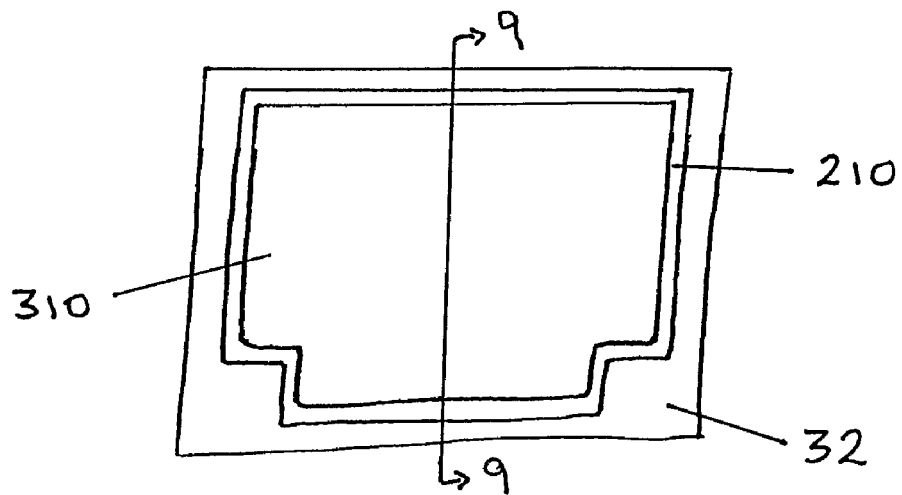
FIG. 8 shows a product being fabricated in accordance with the present invention.

FIG. 8 shows a sample part being fabricated using a process in accordance with the present invention. FIG. 8 shows a wall 210 being built using stereolithography on a build platform 32. As in the example of FIG. 3, the wall 210 defines an isolated volume. As shown in FIG. 8, a small mound of trapped resin 310 has been generated.

Figure 9:
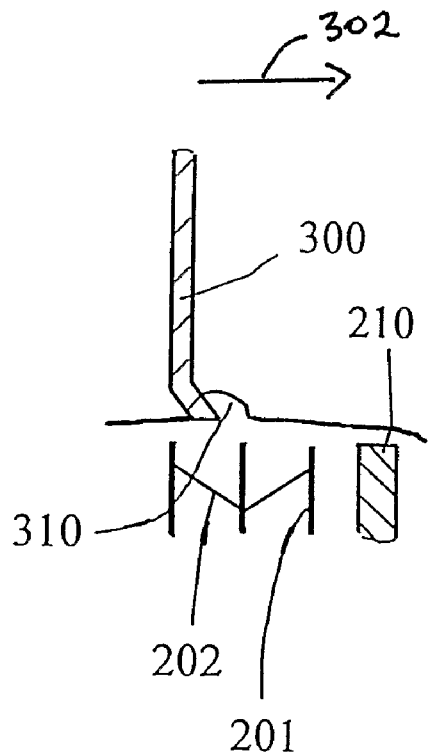
FIG. 9 shows a section of the product of FIG. 8, taken about the line 9-9 of FIG. 8.

FIG. 9 shows a section of the product 210 taken about the line 9-9 in FIG. 8. The section of FIG. 9 shows the wall 210 and the mound of resin 310. Also shown in FIG. 9 is a blade 300 that is being swept across the surface of the resin during the recoating process in the direction shown by the arrow 302.

Figure 4:
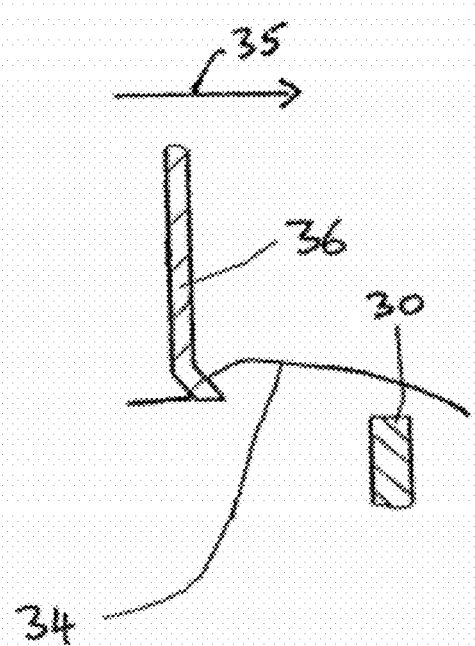
FIG. 4 shows a section of the product of FIG. 3, taken about the line 4-4 of FIG. 3.

As described above with reference to FIGS. 3 and 4, when the part 30 was fabricated in accordance with a prior art method, a large amount of resin 34 was created in front of the blade 36 above wall 30 of the trapped volume during the recoating process. As shown in FIGS. 8 and 9, when the part 210 was fabricated in accordance with the method of the present invention, the amount of resin 310 that built up in front of the blade 300 was substantially reduced.

The invention claimed is:

1. A method of controlling the flow of resin within an isolated volume of an article being manufactured using stereolithography, the method comprising repeating the steps of:
   applying a layer of resin; and
   curing said layer of resin, the cured resin forming the said article;
   automatically identifying said isolated volumes; and
   the step of curing said layer of resin including forming one or more removable structures within said isolated volume from cured resin, wherein the said one or more removable structures are strands positioned automatically such that they restrict the flow of resin within said isolated volume, wherein said removable structures include one or more strings connected between adjacent strands, wherein said strings are formed by curing said resin.

2. A method as claimed in claim 1, further comprising the step of removing said removable structures.

* * * * *